May 22, 1928.                                                                    1,670,398
S. C. ABREU
NAIL FOR WOOD AND SIMILAR MATERIAL
Filed Feb. 17, 1927
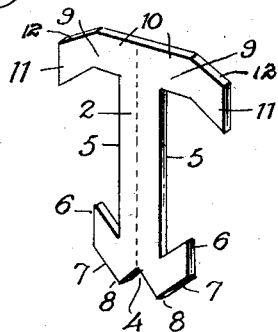
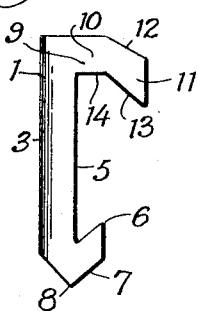
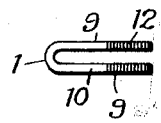
INVENTOR:
S. C. Abreu,
BY
ATTORNEY.

Patented May 22, 1928.

1,670,398

UNITED STATES PATENT OFFICE.

SILVINO CANUTO ABREU, OF RIO DE JANEIRO, BRAZIL.

NAIL FOR WOOD AND SIMILAR MATERIAL.

Application filed February 17, 1927. Serial No. 168,904.

It is well known that the nails heretofore known and used for driving into wood and similar material consist of a small solid shank of metal rounded or square and having at the two opposite ends a head and a point respectively.

The object of this invention is to provide a nail which is constituted not by a solid shank, rounded or squared, but by a narrow strip of sheet-metal, either iron, steel or otherwise pressed in such a manner that it will cause the body of the nail to assume an annular cross section of the nature of a half-round file or the like.

In the accompanying drawing,—

Figure 1 is a view of a blank from which my improved nail is made.

Figure 2 is a side elevation of the nail made therefrom.

Figure 3 is a top plan view of the nail.

The nail 1 is made from the sheet metal blank 2 shown in Figure 1, and which is folded into shape from said blank. The shank 3 of this nail is longitudinally channeled and of substantially U-shaped cross-section. The closed side of the shank is provided at its lower end with a V-shaped notch 4, and the sides 5 of the shank are provided at their lower ends with outwardly and upwardly inclined retaining spurs or projections 6. As shown, the lower edges 7 of these projections are inclined at reverse angles to the edge walls of the notch 4 and intersect the same, thus providing each side or half of the shank with a V-shaped driving point 8.

At their upper ends the sides of the shank are formed with lugs 9 which extend beyond the free edges thereof in parallel relation and provide with the upper edge of the shank a driving head. These lugs have straight inner portions 10 and downwardly inclined outer portions 11, which latter are of wedge formation and progressively increase the depth outwardly of the portions 11 relative to the portions 10. By this construction, the upper edges 12 of the portions 11 are inclined at an obtuse angle to the plane of the shank to allow other than a straight driving blow to be delivered, when desired, while the lower edges 13 of said portions 11 are inclined at an oblique angle to the plane of the shank so as to form undercut recesses 14 under the portions 10 and between the edges 13 and the shank.

The invention provides a cheap wire nail for fastening barbed or other fence wire and the like in a firm and secure manner. The points 8 permit the nail to be easily driven, the spurs 6 hold the nail from loosening and the edges 13 of the lugs 9 hold the wire in the recesses 14 against either outward or vertical displacement.

What is claimed is:—

A nail formed from a single piece of sheet metal and comprising a channelled body portion or shank having its closed side at its lower end formed with a V-shaped notch and having its longitudinal edges at its open side formed with outwardly inclined projections, the lower edges of which are inclined at reverse angles to the walls of the notch and coact therewith to provide V-shaped driving points on opposite sides of the longitudinal center of the shank, the sides of the shank being provided at their upper ends with forwardly extending lugs forming with the upper edges of the shank a head, the outer portions of said lugs being downwardly inclined and of greater depth than their inner ends and said outer portions of said lugs having their upper and lower edges respectively inclined at obtuse and oblique angles to the plane of the shank.

SILVINO CANUTO ABREU.